Aug. 14, 1923.
A. URQUHART
EXPANDING ARBOR
Filed Dec. 24, 1921
1,464,551
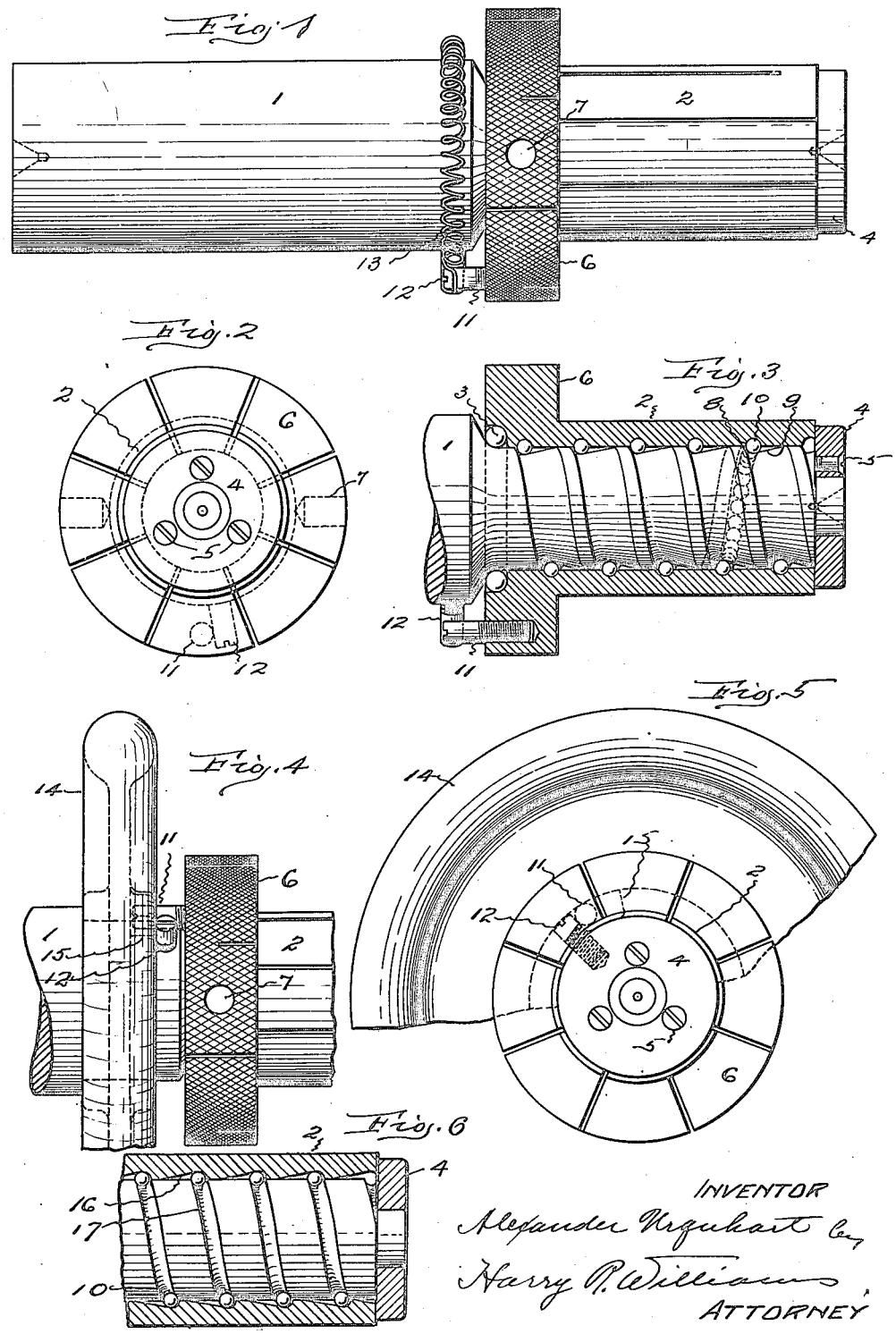

Patented Aug. 14, 1923.

1,464,551

UNITED STATES PATENT OFFICE.

ALEXANDER URQUHART, OF DERBY, CONNECTICUT.

EXPANDING ARBOR.

Application filed December 24, 1921. Serial No. 524,594.

*To all whom it may concern:*

Be it known that I, ALEXANDER URQUHART, a citizen of the United States, residing at Derby, in the county of New Haven and State of Connecticut, have invented a new and useful Improvement in Expanding Arbors, of which the following is a specification.

This invention relates to those arbors which are adapted to be placed in the chucks or spindles or on the centers of engine lathes, turret lathes, grinders, boring mills, drill presses and similar machine tools, for receiving work having a center bore that is but slightly larger than the arbor and which must be tightly held on the arbor while being machined.

The object of the invention is to provide a very simple, cheap and durable construction whereby the arbor can be quickly and powerfully expanded in the bore of a piece of work slipped thereon and easily released therefrom when the machining is completed, the expansive action of the arbor and consequently the hold of the arbor on the work being automatically increased by the resistance of the work to the cutting tool.

In attaining this end a sleeve which is slitted so that it will be radially expansive is rotatably fitted on a section of the body of the arbor and in the interior of the sleeve and on the exterior of the arbor are complementary spiral grooves of such shape and occupied by means of such form that when the sleeve is rotated one way with relation to the arbor said means are forced into a position between the parts which will cause the sleeve to expand practically uniformly all around and when the sleeve is rotated in the opposite direction said means assumes such position that the sleeve may contract to normal size.

In the accompanying drawings Figure 1 shows a side view of an arbor constructed according to this invention. Fig. 2 is an end view of the armor. Fig. 3 shows a longitudinal section of the sleeve on a section of the body of the arbor. Fig. 4 shows a side view of an arbor provided with additional means whereby the expansion and contraction of the arbor may be accomplished quickly and powerfully. Fig. 5 is a face view of the parts shown in Fig. 4. Fig. 6 shows a section of the sleeve and arbor with a modified arrangement of grooves.

The body 1 of the arbor may be of any desired form suitable to be held in a chuck or on the centers of a machine tool. The outer section of the body of the arbor is shown as having a reduced diameter and on this section a sleeve 2 is rotatably fitted. The sleeve is shown as held from longitudinal movement on the arbor at one end by an anti-friction thrust bearing 3 and at the other end by a plate 4 which is fastened by screws 5 to the end of the arbor. The sleeve desirably has a flange or collar 6 which can be knurled on its edge so that it may be conveniently grasped by the hand, and this flange is provided with sockets 7 for the insertion of a pin or application of a spanner wrench, if it is necessary to use more force to turn the sleeve. The sleeve is slitted preferably its entire length at one place and part of its length at other places so that it will be radially flexible.

In the form first shown there is a semi-circular groove 8 cut spirally in the interior of the sleeve, and cut on the exterior of the spindle inside of the sleeve is a complementary spiral groove 9 with a wedge shaped bottom. Filling the groove completly around the arbor, with substantially half in the sleeve and half in the body of the arbor, are balls 10.

Turning the sleeve so as to normally screw it further on the arbor has the effect of crowding the balls into the shallower portions of the groove in the arbor and this causes them to exert an outward pressure on the interior of the sleeve which is equally distributed entirely around it so that the sleeve will be expanded practically uniformly. The spiral on which the grooves are cut is such that the resistance of any piece of work that is slipped upon the sleeve to the cutting action of the tool will tend to expand the sleeve in the bore of the work. When it is desire to remove a piece of work from the arbor the sleeve is turned back, that is, in a direction which would normally screw it off from the arbor. This draws the balls into the deeper portions of the groove in the arbor and allows the sleeve to contract. A pin 11 may be screwed into the flange and a pin 12 may be screwed into the body of the arbor in such relations that the sleeve will not turn backward beyond a certain point. If it is found desirable a spring 13 may be arranged about the arbor from one pin to the other so that the arbor will be lightly expanded in the work and prevent the work from slipping on the arbor should there be an inclination of the sleeve to slacken back while machining uneven work.

A hand wheel 14 may be rotarily mounted on the arbor adjacent to the end of the sleeve. In the hub of this wheel is a pocket 15 the walls of which are in position to engage the pin that projects from the flange and turn the sleeve.

The taper or wedge groove 16 can be cut in the sleeve and the semi-circular groove 17 cut in the arbor if it is desired, as shown in Fig. 6, and these grooves may be right or left hand spiral depending on the direction of rotation of the machine with which the arbor is to be used.

If the bore of the piece of work to be machined is a close fit on the sleeve it is not necessary to use the hand wheel for expanding the sleeve. The work may merely be slipped or turned on the sleeve with the hand and the tool set to work. With a close fit the friction of the work on the sleeve if the work is turned back and the body of the arbor is held or if the work is held while the body of the arbor is rotating, will cause the sleeve to be expanded. The pitch of the spiral and the wedge angle of the groove are so related that an exceedingly powerful expansive force can be developed by the application of small force and little movement. If a heavy cut is taken the resistance of the work to the action of the tool tends to increase the hold of the arbor on the work. As the outward pressure is equal about the arbor and the sleeve thereby expanded practically uniformly the periphery of the sleeve will carry the work concentrically true. With the construction described pieces of work can be applied to or removed from the arbor very quickly.

The invention claimed is:—

1. An expanding arbor comprising a body portion, an expansible sleeve rotatably mounted on the body portion, a spiral groove formed in the interior of the sleeve, a spiral groove formed on the exterior of the body portion in the sleeve, and means loosely located in these grooves and adapted to be forced radially outward and expand the sleeve when the sleeve is rotated in one direction with relation to the body portion of the arbor.

2. An expanding arbor comprising a body portion, a slitted sleeve rotatably mounted on the body portion, complementary spiral grooves in the interior of the sleeve and on the exterior of the body portion in the sleeve, and means loosely located in said grooves and adapted to be forced radially outward and expand the sleeve when the sleeve is turned in one direction with relation to the body portion of the arbor.

3. An expanding arbor having a body portion a section of which is provided with a spiral groove that has a tapered bottom, a sleeve rotatably mounted on said section and provided with a semi-circular groove, and balls occupying said grooves and adapted, when the sleeve is turned in one direction with relation to the body portion of the arbor, to expand the sleeve.

4. An expanding arbor having a body portion a section of which is provided with a spiral groove that has a tapered bottom, a sleeve rotatably mounted on said section and provided with a semi-circular groove, and means arranged in said grooves and adapted to expand the sleeve.

5. An expanding arbor comprising a body portion, a sleeve rotatably mounted on the body portion, complementary spiral grooves on the exterior of the arbor and on the interior of the sleeve, means located in said grooves to effect the expanding of the sleeve when the sleeve is rotated in one direction with relation to the body portion of the arbor, and stop pins projecting from the sleeve and body portion to limit the backward movement of the former with relation to the latter.

6. An expanding arbor comprising a body portion, a sleeve rotatably mounted on the body portion, complementary spiral grooves on the exterior of the arbor and on the interior of the sleeve, means located in said grooves to effect the expanding of the sleeve when the sleeve is rotated in one direction with relation to the body portion of the arbor, stop pins projecting from the sleeve and body portion to limit the backward movement of the former with relation to the latter, and a hand wheel arranged to engage the pin projecting from the sleeve for turning the sleeve.

7. An expanding arbor comprising a body portion, an expansible sleeve rotatably mounted on the body portion, a spiral groove formed in the interior of the sleeve, a spiral groove formed on the exterior of the body portion in the sleeve, and balls occupying these grooves and adapted to expand the sleeve when the sleeve is rotated in one direction with relation to the arbor.

8. An expanding arbor having a threaded section, a sleeve rotatably mounted on the threaded section, said sleeve having an interior thread, balls filling the thread grooves, and a hand wheel arranged to turn the sleeve with relation to the arbor.

9. An expanding arbor having a threaded section, a sleeve rotatably mounted on the threaded section, said sleeve having an interior thread, expanding means occupying the thread grooves, and a hand wheel arranged to turn the sleeve with relation to the arbor.

10. An expanding arbor comprising a body portion, an expansible sleeve rotatably mounted on the body portion, complementary spiral grooves in the interior of the sleeve and on the exterior of the body portion of the arbor, means located in said grooves and adapted to expand the sleeve when the sleeve is turned in one direction with relation to the body portion of the arbor, and a spring tending to draw the sleeve into expanded condition.

ALEXANDER URQUHART.